United States Patent
Suzuki et al.

(10) Patent No.: US 10,488,270 B2
(45) Date of Patent: Nov. 26, 2019

(54) PLATINUM TEMPERATURE SENSOR ELEMENT

(71) Applicant: KOA Corporation, Nagano (JP)

(72) Inventors: Ryusuke Suzuki, Tokyo (JP); Takumi Ashikawa, Tokyo (JP); Katsuya Miura, Tokyo (JP)

(73) Assignee: KOA CORPORATION, Nagano (JP)

(*) Notice: Subject to any disclaimer, the term of this patent is extended or adjusted under 35 U.S.C. 154(b) by 0 days.

(21) Appl. No.: 15/784,695

(22) Filed: Oct. 16, 2017

(65) Prior Publication Data
US 2018/0106687 A1    Apr. 19, 2018

(30) Foreign Application Priority Data

Oct. 17, 2016 (JP) .................. 2016-203846

(51) Int. Cl.
| | |
|---|---|
| G01K 7/18 | (2006.01) |
| H01C 1/14 | (2006.01) |
| H01C 7/02 | (2006.01) |
| H01C 3/12 | (2006.01) |
| H01C 7/06 | (2006.01) |
| G01P 5/12 | (2006.01) |

(52) U.S. Cl.
CPC .............. G01K 7/18 (2013.01); G01K 7/183 (2013.01); G01P 5/12 (2013.01); H01C 1/14 (2013.01); H01C 1/1406 (2013.01); H01C 3/12 (2013.01); H01C 7/021 (2013.01); H01C 7/06 (2013.01)

(58) Field of Classification Search
CPC ...... H01C 1/1406; H01C 7/021; H01C 17/06; H01C 17/06513; G01K 7/18; G01K 7/183

USPC ................................................ 338/25, 22 R
See application file for complete search history.

(56) References Cited

U.S. PATENT DOCUMENTS

| | | | | |
|---|---|---|---|---|
| 4,213,113 A | * | 7/1980 | Brandt .................... | H01C 1/14 338/165 |
| 5,735,606 A | * | 4/1998 | Tani ........................ | G01F 1/6845 338/25 |
| 6,437,681 B1 | * | 8/2002 | Wang ....................... | G01K 7/183 338/25 |
| 6,543,102 B1 | * | 4/2003 | Zitzmann ............... | G01F 1/6845 29/612 |
| 7,339,455 B2 | * | 3/2008 | Fujita ..................... | G01K 7/18 338/25 |
| 7,746,212 B2 | * | 6/2010 | Zitzmann ............... | G01K 7/186 338/22 R |

(Continued)

FOREIGN PATENT DOCUMENTS

| | | |
|---|---|---|
| JP | S62111402 A | 5/1987 |
| JP | 09068512 | 3/1997 |

*Primary Examiner* — Kyung S Lee
(74) *Attorney, Agent, or Firm* — Edell, Shapiro & Finnan, LLC

(57) ABSTRACT

A temperature sensor element has such a structure as, when reinforcing lead wires on internal electrodes with a paste, one side surface of each of the lead wires is covered with a reinforcement paste and the other side surface is not covered with the reinforcement paste without covering the entire lead wires welded and connected to the internal electrodes. This allows elimination of cause of cracks generating, thereby securing sufficient joining strength and reinforcement of conductivity of the internal electrodes and the lead wires, and securing connection strength between the lead wires and the internal electrodes.

4 Claims, 5 Drawing Sheets

(56) References Cited

U.S. PATENT DOCUMENTS

| | | | |
|---|---|---|---|
| 8,138,881 B2* | 3/2012 | Zinkevich | G01K 7/183 338/22 R |
| 8,183,974 B2* | 5/2012 | Wienand | G01K 1/10 338/25 |
| 8,730,002 B2* | 5/2014 | Wienand | G01K 7/183 338/13 |

* cited by examiner

PLATINUM TEMPERATURE SENSOR ELEMENT

TECHNICAL FIELD

The present invention relates to a platinum temperature sensor element used in an air-flow sensor for measuring air intake passing through an air inlet pipe, for example.

BACKGROUND

Conventionally, air intake in internal combustion engines such as gasoline engines has been measured by providing an air-flow sensor within an air inlet pipe in order to inject fuel in accordance with the quantity of air intake. Moreover, recently, air-flow sensors are also used for air-flow control in air conditioning equipment in a building, factory, etc., and control of wind speed and air flow etc. in environmental equipment.

There are two types of air-flow sensors: a hot type (also called a hot wire type) that utilizes change in resistance of a heated wire as a result of current flowing through a platinum element (platinum hot wire) so as to increase the temperature through self-heating, and losing heat as the air hits its heating portion; and a cold type that measures air temperature as is. Since either type of sensor needs to be placed within an air flow and to measure the temperature of the air accurately, it is necessary to control fluctuation in element resistance, fluctuation in TCR (temperature coefficient of resistance), fluctuation in how heat dissipates, and fluctuation due to turbulence of air flow around the element, etc.

Platinum is used in thin-film temperature sensors that require heat resistance as it has stable properties and excellent resistance-temperature characteristics. Such thin-film temperature sensors have lead wires welded to electrode parts, and an insulating material, such as glass or a conductive material including a precious metal for reinforcing connections applied on the welded parts so as to strengthen the connections. Patent Document 1, for example, discloses a thin-film thermistor having an Au—Pt layer formed on welded parts of an Au—Pt electrode film and lead wires on a substrate, and further covered with a glass layer so as to improve conductivity and heat resistance.

Patent Document 2 discloses a technique of providing electrode pads made of an Au—Pt alloy on the substrate of a gas sensor, connecting the lead wires to the pads for the purpose of improving durability of the gas sensor against change in temperature, maintaining connection strength of lead wires to the electrode pads, and further increasing the connection strength of the lead wires, and then covering them with a protective film.

PATENT DOCUMENTS (AS REFERENCED HEREIN)

Patent Document 1: JP S62-111402A
Patent Document 2: JP H9-68512A

SUMMARY OF THE INVENTION

The above-given conventional thermistor has a problem that if a glass paste material or a paste material including glass is used as a connection reinforcing material between the electrode pads and the lead wires on the substrate, stress is applied on the welded parts through compressive stress and tensile stress due to difference in thermal expansion of the glass, thereby generating cracks. Glass easily cracks, and therefore welded parts lack electrical reliability when reinforced by only glass, wherein such reinforcement can be considered a cause for damage.

Moreover, covering the entire lead wires with a reinforcement paste when reinforcing a connecting part of the lead wires and the electrode pads using the reinforcement paste brings about a problem that spaces form between the reinforcing paste material and the lead wires and between the reinforcing paste material and the electrode pads due to supplying method of the reinforcement paste material, viscosity of the used paste material etc., and thus sufficient joining between the lead wires and the electrode pads cannot be secured. That is, when the entire lead wires are covered by the reinforcing paste material so that the reinforcement paste is completely adhered to the lead wires, there is fear of cracks forming from difference in shrinkage rate etc. of the paste material and the lead wires.

Furthermore, Patent Document 2 discloses gold (Au), which can be calcined at a low temperature and easily bonded to pads and lead wires, used as a favorable material for a protective film. However, Au is an expensive material and would increase costs of a sensor etc.

The present invention is devised in light of these problems, and aims to secure connection strength between lead wires and internal electrodes of a platinum temperature sensor element.

The present invention achieves the above objective, and the configuration below, for example, is merely an exemplary means for resolving the above problems. Namely, a platinum temperature sensor element according to the present invention is characterized by including: an insulating substrate having a planar rectangular shape made of an insulating material with a predetermined thickness; a pattern made of a platinum resistance film formed on the insulating substrate; a pair of electrodes formed on either end along the length of the insulating substrate; lead wires that are joined to the pair of electrodes and extend to the outside; and a protective film that is formed on a top side of the insulating substrate to cover the pattern, the pair of electrodes, and top surfaces of joined regions of the lead wires to the pair of electrodes. One side surfaces of the lead wires and top surfaces of the pair of electrodes on the one side surfaces are covered with a reinforcement paste on the joined regions.

For example, a concave part for housing the lead wires is characterized by being formed on each of the pair of electrodes. Moreover, for example, multiple regions on the one side surfaces of the lead wires on the joined regions, or multiple regions on the one side surfaces and the other side surfaces of the lead wires on the joined regions are characterized by being covered with the reinforcement paste. Furthermore, for example, the pair of electrodes, a surface protective material for the lead wires, and the reinforcement paste are characterized by being made of a common precious metal material. Yet further, for example, the precious metal material is characterized by including at least platinum.

According to the present invention, a platinum temperature sensor element that reduces thermal-stress load on a connecting part of lead wires and internal electrodes, and does not generate cracks may be provided.

DETAILED DESCRIPTION

Figure 1:
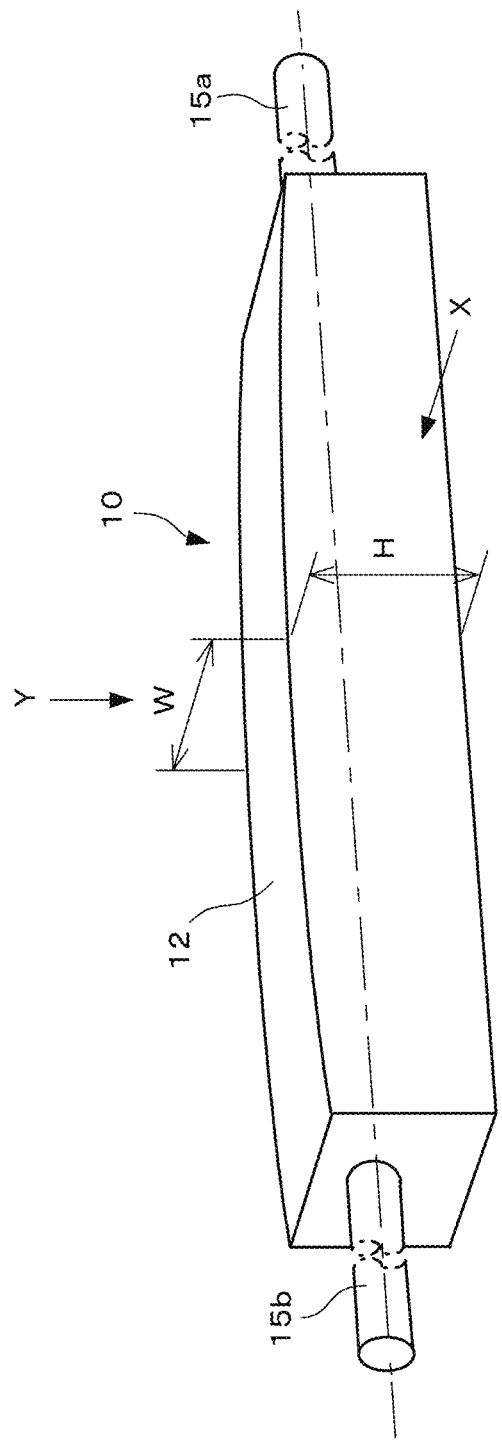
FIG. 1 is a diagram illustrating an external structure of a temperature sensor element according to an embodiment of the present invention.

An embodiment according to the present invention is described in detail below with reference to accompanying drawings. FIG. 1 illustrates an external structure of a temperature sensor element according to the embodiment of the present invention. Moreover, FIG. 2A is a cross-section of a structure of the temperature sensor element of FIG. 1 when viewed from an X direction (horizontal direction), and FIG. 2B is a cross-section of a structure of the same when viewed from a Y direction (vertical direction).

As illustrated in FIG. 1, a temperature sensor element 10 according to the embodiment includes an element main body 12 and lead wires 15a and 15b, which are led from either end of the element main body 12 along the length thereof. The temperature sensor element 10 has an overall square-columnar shape (prismatic bar) without any irregularities on the outer surface, and the shape of the cross-section (vertical cross-sectional shape or transverse cross-sectional shape) orthogonal to the length of the element is approximately square even at any location along the length of the element.

Figure 2A:
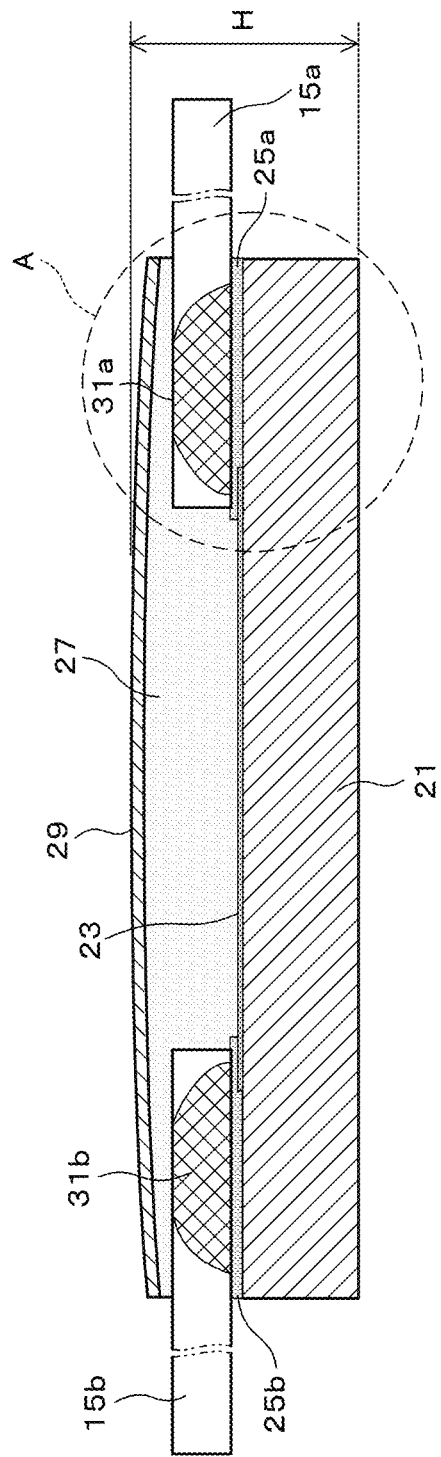
FIG. 2A is a cross-section of the temperature sensor element of FIG. 1 viewed from the horizontal direction.
Figure 2B:
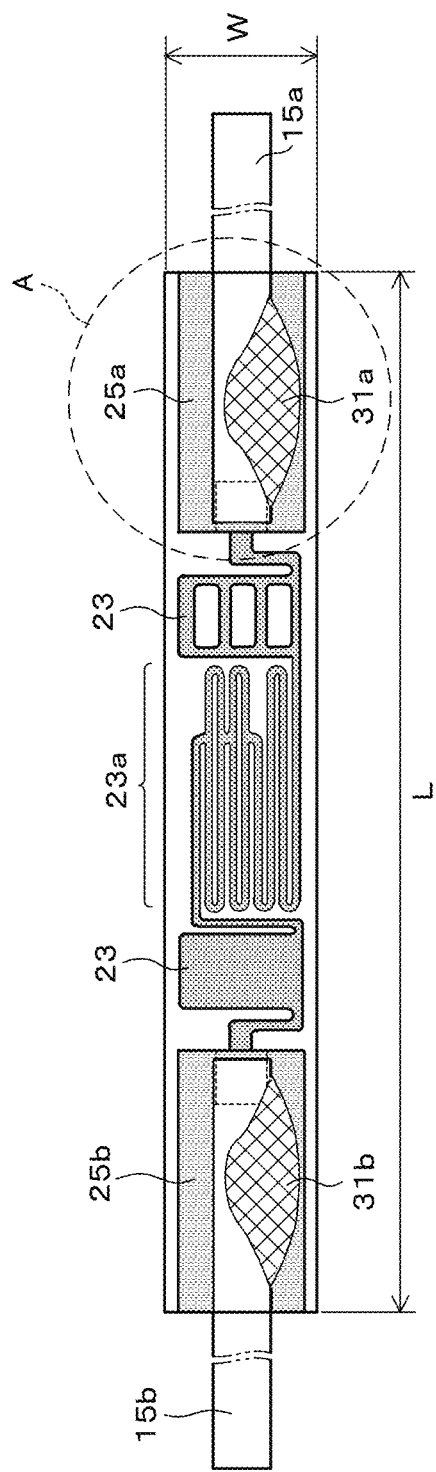
FIG. 2B is a cross-section of the temperature sensor element of FIG. 1 viewed from the vertical direction.

In the temperature sensor element 10 illustrated in FIG. 2A and FIG. 2B, internal electrodes (electrode pads) 25a and 25b are formed on either top end of a substrate 21 that has a planar rectangular shape and a predetermined thickness, and a resistance film 23 made in a predetermined pattern is formed between the internal electrodes 25a and 25b. Moreover, ends of the lead wires 15a and 15b are connected to the internal electrodes 25a and 25b, respectively, by welding or the like.

A protective film 27 is formed on the top side of the substrate 21 so as to cover the internal electrodes 25a and 25b, the resistance film 23, and the top surfaces of joined regions of the lead wires 15a and 15b connected to the internal electrodes 25a and 25b, and a surface layer protective film 29 is formed covering the entire protective film 27.

The temperature sensor element 10 has length L (length along the length of the substrate 21) of 2 mm, for example, height H (height at the center along the length) of 0.6 mm, for example, and width W (also width of the substrate 21) of 0.4 mm, for example. The substrate 21 is made of an electric insulating ceramic substrate or an alumina substrate ($Al_2O_3$), etc. having a thickness of approximately 0.3 mm, for example.

The resistance film 23 formed on the substrate 21 is a thin resistance film (platinum resistance film pattern) made of platinum (Pt). The lead wires 15a and 15b are platinum-covered nickel core wires having a diameter of 0.15 mm, for example. The internal electrodes 25a and 25b are printed using an electrode paste containing platinum or the like, for example. Moreover, the protective film 27 and the surface layer protective film 29 (referred to hereafter as protective films 27 and 29) are made of heat-resistant glass, for example, having a small linear expansion coefficient.

The longitudinal cross-section of the protective films 27 and 29 has a shape that is thickest at the center along the length of the element and decreases slightly as it approaches either end, as illustrated in FIG. 2A. More specifically, thickness 'a' of the protective films 27 and 29 at the center is 0.35 mm, for example, and thicknesses of the top surfaces of joined regions to the lead wires 15a and 15b are 130 to 180 μm, for example.

In this manner, the entire temperature sensor element 10 has a square columnar (prismatic bar) shape formed by the protective films making the top surfaces of joined regions of the lead wires 15a and 15b connected to the internal electrodes 25a and 25b have a fixed thickness, and the vertical cross sectional shape orthogonal to the length of the element has nearly a square shape even at any portion along the length, as described above. Moreover, provision of the protective films 27 and 29 on top of the lead wires 15a and 15b allows fixation of the lead wires on the substrate.

The temperature sensor element 10 according to the embodiment is a self-heating element using a platinum hot wire (a platinum heating coil). The center part of the resistance film 23, as illustrated in FIG. 2B, is a heating part 23a made of a meander-shaped pattern that self-heats once an electric current is applied. The heating part 23a is positioned nearly at the center in the longitudinal direction and the width direction of the substrate 21 when viewed from above, and is positioned nearly at the center even along the thickness of the temperature sensor element 10 since it is between the substrate 21 and the protective films 27 and 29.

Since the heating part 23a of the temperature sensor element 10 is positioned at nearly the center of the resistance film pattern and at nearly the center of the height and width directions of the sensor element, the vicinity of the center of the temperature sensor element is a heat-generating point. That is, since provision of a heat-generating configuration at the center of the sensor element rids deviation of heat generation and makes heat release to the lead wires 15a and 15b constant and stabilized, there is an advantage that adjustment of heat release can be reduced to a minimum (only a small span of adjustable range is necessary.)

Note that if the heat-generating point of the self-heating temperature sensor element is positioned away from the vicinity of the center of the element, heat release to the lead wires changes and is not constant, and thus the necessary electric current for heating the heating part also changes. Therefore, a countermeasure against fluctuation (adjustment of measuring circuit etc.) in air flow measurements due to such fluctuation of generated heat, heat release, etc. is necessary.

Figure 3A:
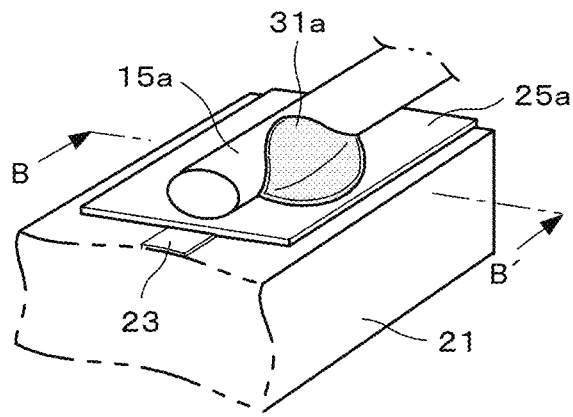
FIG. 3A is a perspective view of a portion indicated by a circle A in FIG. 2.
Figure 3B:
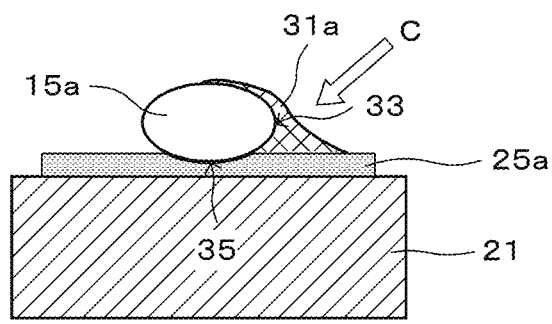
FIG. 3B is a cross-section of the sensor element illustrated in FIG. 3A cut along a line B-B' indicated by arrows.

Next, a connection structure of the lead wires and the electrode pads of the temperature sensor element according to the embodiment is described. FIG. 3A is a perspective view of a portion indicated by dotted-line circles A in FIGS. 2A and 2B, and FIG. 3B is a cross-section of the sensor element illustrated in FIG. 3A cut along a line B-B' indicated by arrows. Note that the protective films formed on top of the lead wires in FIGS. 3A and 3B are omitted from the drawings.

The temperature sensor element according to the embodiment has one side surface (one side) 33 of the lead wire 15a and a top surface of the internal electrode 25a on the same side as the one side surface of the lead wire covered with a reinforcement paste 31a without covering with the reinforcement paste the entire lead wire 15a that is welded and connected to the internal electrode 25a, as illustrated in FIG. 2 and FIG. 3. The reinforcement paste 31a is made of a platinum paste containing glass, for example.

That is, when the portion connecting the lead wire 15a and the internal electrode 25a is viewed from above, such a structure is found as one side surface of the lead wire 15a and the top surface on one side of the internal electrode 25a having the lead wire 15a at the center are covered using the reinforcement paste 31a, and also as the other side surface of the lead wire 15a and the top surface on the other side of the internal electrode 25a are not covered with the reinforcement paste, as shown in FIG. 2B.

Covering only one side surface 33 of the lead wire 15a and the top surface of the internal electrode 25a on the same side in this manner is for obtaining fixing strength of a protective film (glass reinforcing film) formed on top of the lead wire after the covering process, and obtaining overall strength of the protective film and the internal electrode. Therefore, covering a large part of the internal electrode with the reinforcement paste is not desirable from the viewpoint of securing a large area of the internal electrode that is not covered with the reinforcement paste.

When covering the one side surface of the lead wire 15a with a reinforcement paste as described above, the reinforcement paste 31a is filled in from diagonally above as indicated by an arrow C in FIG. 3B using a dispenser or the like. At this time, the reinforcement paste 31a is aligned to a welded point where the lead wire 15a is welded and connected to the internal electrode 25a so as to be filled in. The filled-in reinforcement paste is then calcined at a temperature of 800° C. to 850° C., for example.

This allows filling in and adhering of the reinforcement paste 31a between the internal electrode 25a and the lead wire 15a without any air bubbles or air spaces between them, thereby securing sufficient joining strength and conductivity of the internal electrode 25a and the lead wire 15a.

Note that a concave groove (depression) 35 is formed in the internal electrode 25a through an electrode printing process, for example. The same holds true for the internal electrode 25b. This allows holding of the lead wire 15a at the center along the width of the substrate 21, and prevention of shifting when welding together the lead wire 15a and the internal electrode 25a. Depth of the concave groove 35 should be thick enough to secure the thickness of the internal electrode 25a below the welded lead wire 15a.

As described above, the temperature sensor element according to the embodiment has such a structure as, when reinforcing the lead wire welded and connected on the internal electrode, one side surface (one side) of each of the lead wires and the top surface of each of the internal electrodes on the same side as the one side surface are covered with a reinforcement paste, and the other side surface of each of the lead wires and the top surface of each of the internal electrodes on the other side are not covered with the reinforcement paste.

As such, not covering the entire periphery of the lead wires with a reinforcement paste allows reduction in thermal-stress load (stress) due to heating, cooling etc. of the heating part of the temperature sensor element, and elimination of the cause of cracks generating in welded portions, etc. As a result, sufficient joining strength between the internal electrode and the lead wire can be secured, and conductivity between the internal electrode and the lead wire can be reinforced.

The present invention is not limited to the above embodiment, and various modifications are possible.

<Modification 1>

Figure 4:
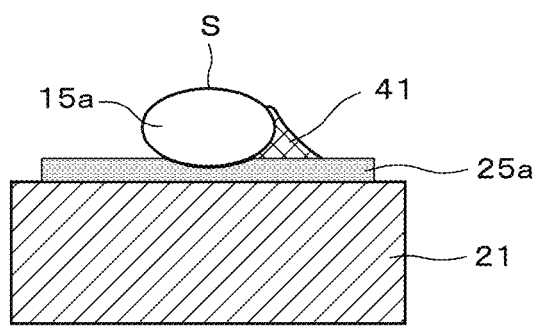
FIG. 4 is a diagram illustrating a modification of an area to be covered with a reinforcing paste formed on one side surface of a lead wire.

Of the temperature sensor element according to the embodiment, the region covered with the reinforcement paste 31a on the one side surface 33 of the lead wire 15a reaches the vicinity of the top of the lead wire 15a, as illustrated in FIGS. 2 and 3, but the region to be covered is not limited thereto. A region to be covered by a reinforcement paste 41 on one side surface of the lead wire 15a, as illustrated in FIG. 4, for example, may be reduced so as not to reach the top (indicated by S in the drawing) of the lead wire so that the internal electrode 25a and the lead wire 15a are joined together using the reinforcement paste 41. This allows control of filling amount of the reinforcement paste so as to secure joining strength between the internal electrode and the lead wire using a minimum amount of the reinforcement paste.

<Modification 2>

The number of reinforcing regions on the lead wire using a reinforcement paste is one for each lead wire in the example of FIGS. 2 and 3 but is not limited thereto. As long as such a structure as a reinforcement paste is covering one side surface of a lead wire and the top surface on one side of an internal electrode is adopted, two reinforcing regions may be provided on the one side surface of the lead wire. For example, reinforcement pastes 43 and 45 formed in two places, as illustrated in FIG. 5A, may cover one side surface of the lead wire 15a and the top surface on one side of the internal electrode 25a.

Figure 5A:
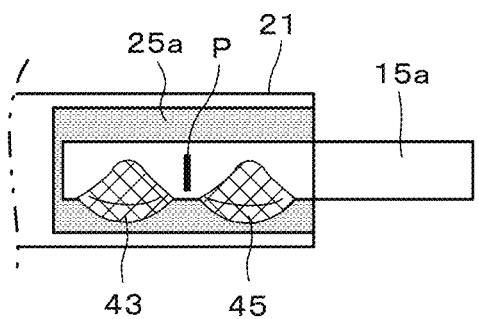
FIG. 5A is a diagram illustrating a modification of reinforcing regions when covering a lead wire and an internal electrode with a reinforcing paste.
Figure 5B:
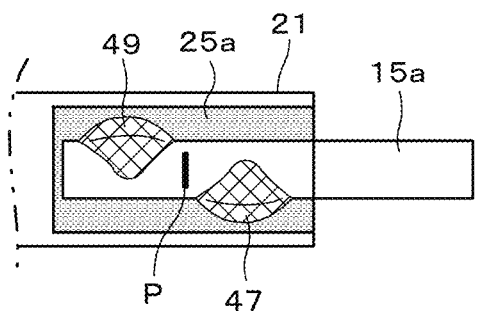
FIG. 5B is a diagram illustrating another modification of reinforcing regions when covering a lead wire and an internal electrode with a reinforcing paste.

Alternatively, as illustrated in FIG. 5B, a structure providing a reinforcement at a total of two places is possible by providing one reinforcing region using the reinforcement paste 47 for covering one side surface of the lead wire 15a and the top surface on one side of the internal electrode 25a, and providing one reinforcing region using the reinforcement paste 49 for covering the other side surface of the lead wire 15a and the top surface on the other side of the internal electrode 25a.

In either case of FIG. 5A or 5B, a reinforcing region is a position away from the welded point (indicated by P in the drawing) at which the lead wire 15a is welded and connected to the internal electrode 25a in which the reinforcement paste is filled. As a result, the lead wire 15a and the internal electrode 25a are joined and reinforced at multiple regions.

DESCRIPTION OF REFERENCE NUMERALS

10: Temperature sensor element
12: Element main body
15a, 16b: Lead wire
21: Substrate
23: Resistance film
23a: Heating part
25a, 25b: Internal electrode
27: Protective film
29: Surface layer protective film
31a, 43, 45: Reinforcement paste
33: One side surface of the lead wire (one side)
35: Concave groove

What is claimed:

1. A platinum temperature sensor element comprising:
   an insulating substrate having a planar rectangular shape made of an insulating material with a predetermined thickness;
   a pattern made of a platinum resistance film formed on the insulating substrate;

a pair of electrodes formed on either end along a length of the insulating substrate;

lead wires that are joined to the respective paired electrodes and extend to an outside of the platinum temperature sensor element; and a protective film that is formed on a top side of the insulating substrate to cover the pattern, the paired electrodes, and top surfaces of joined regions of the lead wires to the paired electrodes;

wherein:

lower surfaces of ends of the lead wires are connected to a top surface of the electrodes, and one side surface of each of the lead wires and top surfaces of the pair of electrodes on the same side as the one side surfaces are only partially covered with a reinforcement paste on the joined regions; and each of multiple regions on the one side surface of each of the lead wires on the joined regions, or each of multiple regions on the one side surface and the other side surface of each of the lead wires on the joined regions are covered separately with the reinforcement paste.

2. The platinum temperature sensor element of claim 1, wherein a concave part for housing the lead wires is formed on each of the pair of electrodes.

3. The platinum temperature sensor element of claim 1, wherein the pair of electrodes, a surface protective material for the lead wires, and the reinforcement paste are made of a common precious metal material.

4. The platinum temperature sensor element of claim 3, wherein the precious metal material includes at least platinum.

* * * * *